Figures 1, 2:
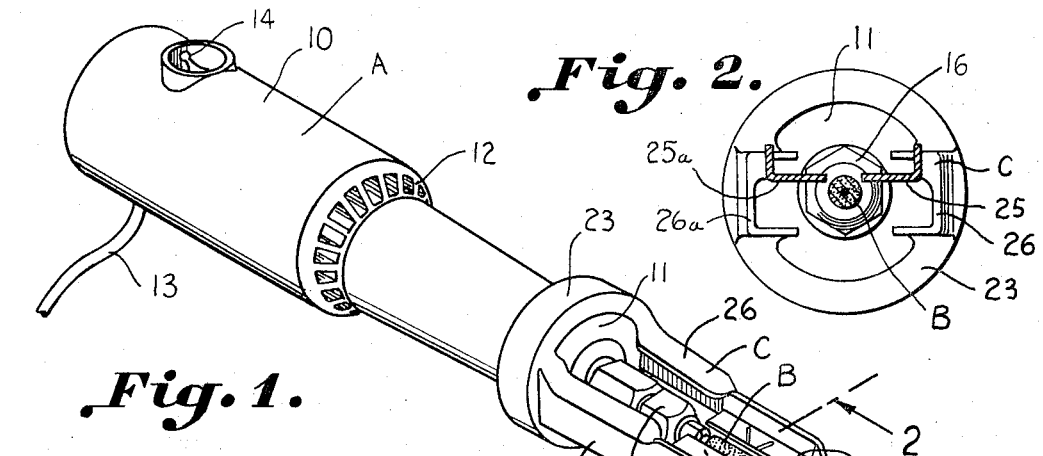

Nov. 28, 1967     P. H. KENNEMORE     3,354,753

SAW CHAIN SHARPENER

Filed Feb. 1, 1966

INVENTOR.
PAUL H. KENNEMORE

BY

ATTORNEY

United States Patent Office 3,354,753
Patented Nov. 28, 1967

3,354,753
SAW CHAIN SHARPENER
Paul H. Kennemore, P.O. Box 12,
Greenwood, S.C. 29646
Filed Feb. 1, 1966, Ser. No. 524,033
3 Claims. (Cl. 76—37)

This invention relates to a grinding tool and more particularly to a grinding tool for sharpening the teeth of a power saw chain.

Heretofore, one means of sharpening the teeth of a saw chain has been with a hand file. Unless the person who is sharpening the teeth is extremely skilled with a file, it is difficult to obtain the proper cutting edge angle on the teeth. One reason for this is due to the fact that alternate teeth of the saw chain must be sharpened with a file from opposite sides of the chain. Another reason is due to the pushing motion that must be imparted to the file during the sharpening operation.

When the teeth of a saw chain are filed improperly, chattering will take place causing excessive sprocket and guide bar wear. Also, when the cutting angle of the teeth is not uniform, the chain will run to the side preventing a clean and accurate cut and causing undesired wear of the guide bar and the chain.

In attempts to sharpen a saw chain properly, apparatus, such as illustrated in Patent No. 2,818,752, issued Jan. 7, 1958, to Elof Grunberg have been provided. In such a device gripping members are provided for gripping the chain and guide bar during the sharpening operation. One of the gripping members must be loosened each time the chain is moved to sharpen a different tooth.

Other larger devices mounted on stands have also been produced, but they have proven to be impractical since a logger may need to sharpen his saw twice during a day while cutting timber. A logger needs a device that he can use in the woods when his saw chain becomes dull. In order to provide loggers with devices that may be carried with them in a logging truck, file holders have been produced, such as illustrated in Patent No. 2,664,017, issued to J. B. Cox on Dec. 29, 1953. As previously mentioned, it is difficult to file all the teeth of a saw chain uniformly with a hand file due to the different positions taken by the filer when he changes sides.

The subject invention contemplates a device for sharpening the teeth of a saw chain, such as utilized on a chipper-type saw chain tooth, which is portable and may be used by a logger in the woods. Moreover, only a minimum amount of skill is required to use a device constructed in accordance with the present invention to sharpen a saw chain.

Accordingly, it is an important object of this invention to provide a sharpening tool for saw chains which requires a minimum amount of skill to sharpen a saw chain properly.

Another important object of this invention is to provide a sharpening tool for saw chains which may be used in the woods.

Still another object of this invention is to provide a tool for sharpening saw chains which does not require the chain to be removed from the saw.

Another important object of this invention is to provide a tool for sharpening saw chains which does not require special apparatus for holding the chain during the sharpening operation.

A further object of this invention is to provide a tool for sharpening an entire saw chain from one side of the chain.

Still another important object of this invention is to provide a tool for sharpening a saw chain that incorporates a guide which aids in aligning an elongated abrasive rock for achieving the proper cutting angle on a tooth while the cutting edge of the tooth is visble.

Another object of the present invention is to provide a tool for sharpening a saw chain which minimizes the time necessary to sharpen the saw chain.

Figure 3:
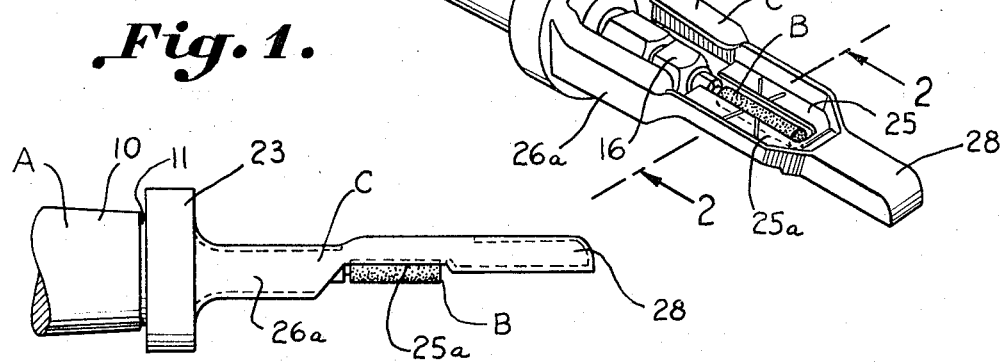
Figure 4:
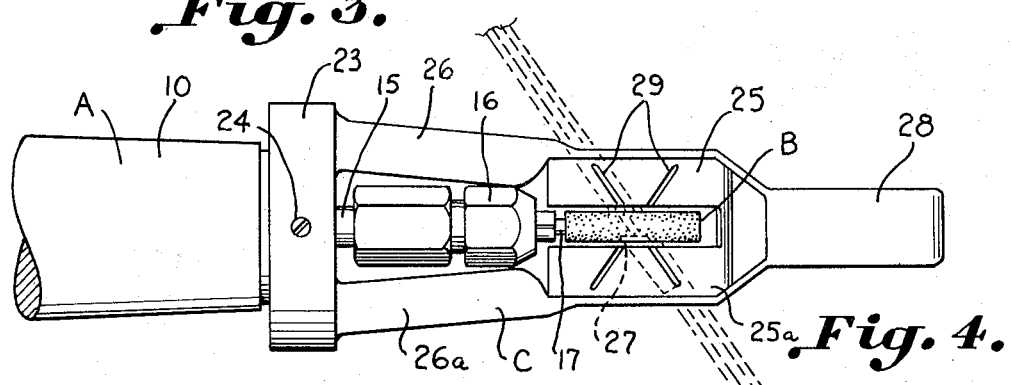
Figure 5:
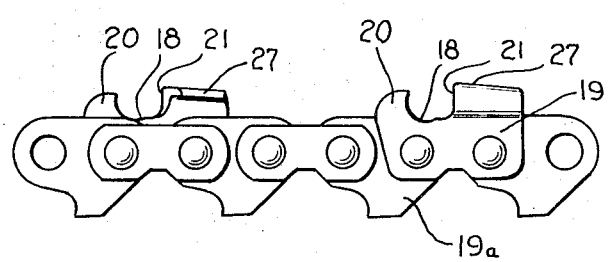

The invention will be more readily understood from a reading of the following specification and by reference to the accompanying drawing forming a part thereof, wherein an example of the invention is shown and wherein:

FIGURE 1 is a perspective view illustrating a saw chain sharpener constructed in accordance with the present invention, FIGURE 2 is a transverse sectional elevation taken on the line 2—2 in FIGURE 1, FIGURE 3 is a side elevational view of the front portion of the saw chain sharpener illustrated in FIGURE 1, FIGURE 4 is a plan view of the front portion of the saw chain sharpener illustrated in FIGURE 1 with a tooth of a saw chain illustrated in broken lines, and FIGURE 5 is a side elevational view of a portion of a saw chain.

The drawing illustrates a portable tool for sharpening the teeth of a saw chain, each tooth having a cutting portion with a top plate thereon and a depth gauge spaced from the cutting portion providing a gullet therebetween. The tool includes a motor A which is enclosed by a housing. The motor A has a rotatable shaft which extends out one end of the housing. An elongated abrasive rock B is carried by the rotatable shaft of the motor in axial alignment therewith. The abrasive rock is of such a size as to fit in the gullet of a tooth of a saw chain between the depth gauge and the cutting portion of the tooth. A guide C aids in positioning the abrasive rock within the gullet of the tooth adjacent the cutting portion of the tooth during the sharpening operation of the tooth. A collar attaches the guide C to the motor housing adjacent the abrasive rock. The guide includes a pair of laterally spaced planar surface members. The planar surface members are spaced vertically above the rotational axis of the elongated rock permitting a small portion of the rock to extend between the spaced planar surface members so that a vertical cutting edge is ground on the cutting portion of the tooth while a hollow ground edge is being ground on the top plate. The planar surface members are spaced laterally defining an elongated opening therebetween, so that a cutting edge of the top plate of said tooth is visible during the sharpening operation of the tooth. When the tool is used to sharpen the teeth of a saw chain one of the planar surfaces rests on the top plate of the tooth being sharpened and provides a guide during the sharpening operation. The teeth on the entire chain can be sharpened from either side of the saw chain.

The motor A is enclosed in a cylindrical housing 10 having a reduced end 11. Vents 12 are provided in the housing permitting the passage of air for cooling the motor. The housing has a wire 13 projecting from the rear for connecting the motor to any suitable source of power. An electrical control switch 14 is recessed in the housing for starting and stopping the motor. One suitable motor for the tool operates at 24,000 revolutions per minute off of a twelve volt battery, such as used in logging trucks. Such a motor enables loggers to sharpen their saw chains while in the woods from the power supplied by the battery of the logging truck. When a logger is cutting timber his saw chain usually requires sharpening at least twice a day. Therefore, it is extremely advantageous to have a tool which can rapidly and accurately sharpen a saw chain in the woods. If it is desired, a motor may be utilized which operates off of 110 volts.

A rotatable shaft 15 projects forwardly from the motor A out one end of the housing 10. A chuck 16 or similar element for receiving a shank 17 of the abrasive rock B is carried on the rotatable shaft. The elongated abrasive rock is of such a size as to fit in the gullet 18 of a tooth 19 of a saw chain 19a between a depth gauge 20 and a cutting portion 21 of the tooth for sharpening the tooth.

A guide C aids in positioning the abrasive rock within the gullet 18 of the tooth 19 adjacent the cutting portion of the tooth 21 during the sharpening operation of the tooth. The guide C has a circular collar 23 integral with one end thereof which is accommodated on the reduced end 11 of the housing 10. A setscrew 24 is carried in the collar 23 for securing the collar 23 and the guide C to the motor housing 10.

The guide C includes a pair of laterally spaced planar surface members 25 and 25a which are attached to the collar 23 by a pair of diametrically disposed channel shaped members 26 and 26a. The planar surface members are spaced vertically above the rotational axis of the elongated abrasive rock B permitting a small portion of the rock to extend between the spaced planar surface members 25 and 25a so that a vertical cutting edge can be ground on the cutting portion of the tooth while a hollow ground edge is being ground on the top plate 27. It is important that a vertical edge be placed on the cutting portion 21 of a tooth because such permits easy feeding of the saw chain into the wood cut. It also permits the cross grains of the timber to be cut cleanly before the top plate 27 routes the chips.

The planar surface members 25 and 25a are laterally spaced defining an elongated opening therebetween so that a cutting edge on the top plate 27 of the tooth is visible during the sharpening operation. The cutting edge on the top plate 27 of the tooth being sharpened is illustrated in broken lines in FIGURE 4. It is important that the cutting edge on the top plate of the tooth be visible at all times during the sharpening operation to insure grinding the proper cutting edge on the tooth.

The free-ends of the planar surface members 25 and 25a are integral with a longitudinally extending projection 28 which the tool operator can hold in one hand to aid in positioning and holding the tool during the sharpening operation.

The planar surface members 25 and 25a have a pair of 35 degree angle marks 29 thereon, which aid in aligning the abrasive rock B with the saw chain during the sharpening operation. By providing a pair of crossed marks the tool may be used to sharpen both right and left-hand mounted teeth on the chain from the same side of the chain. It is important that the abrasive rock B be positioned at a thirty-five degree angle relative to the tooth being sharpened so that the desired cutting angle can be placed on the teeth. When the teeth have the proper cutting angle a straight, accurate cut can be achieved without excesive wear on the chain. Uniform cutting angles on all of the teeth also prevents the chain from running to one side or the other of the guide bar, which is generally referred to as side draft. Side draft causes excessive guide bar and sprocket wear of the saw.

When the tool is being used to sharpen the teeth of a saw chain an angle mark 29 is aligned with the saw chain 19, as illustrated diagrammatically in broken lines in FIGURE 4. One of the planar surfaces 25 or 25a rests on the top plate 27 of the tooth being sharpened and provides a guide during the sharpening operation. After the tool is properly aligned relative to the chain, such is turned on grinding a substantially vertical cutting edge on the cutting portion 21 of the tooth while grinding a hollow ground edge on the top plate 27.

Since the guide includes a pair of planar members 25 and 25a, and a pair of opposed angle marks 29, both left and right-hand mounted teeth of a saw chain may be sharpened from the same side of the saw. An entire saw chain may be sharpened with a tool constructed in accordance with the present invention in approximately five minutes.

While a preferred embodiment of the invention has been described using specific terms, such description is for illustrative purposes only, and it is to be understood that changes and variations may be made without departing from the spirit or scope of the following claims.

What is claimed is:

1. In a portable tool for sharpening teeth of a saw chain, each tooth having a cutting portion with a top plate thereon and a depth gauge spaced from the cutting portion providing a gullet therebetween, comprising: a motor; a housing enclosing said motor; said motor having a rotatable shaft extending out one end of said housing; an elongated abrasive rock, said abrasive rock being carried by said rotatable shaft of said motor in axial alignment therewith, said abrasive rock being of such size as to fit in the gullet of a tooth of a saw chain between the depth gauge and the cutting portion of the tooth; a guide for positioning said abrasive rock within the gullet of said tooth adjacent said cutting portion of said tooth during the sharpening operation of said tooth, said guide including a pair of laterally spaced planar surface members, said planar surface members being spaced vertically above the rotational axis of said elongated abrasive rock permitting a portion of said rock to extend between said spaced planar surface members so that a vertical cutting edge can be placed on the cutting portion of the tooth, while a hollow ground edge can be placed on said top plate, and said planar surface members being spaced laterally defining an elongated opening therebetween so that a cutting edge of the top plate of said tooth is visible during the sharpening operation of said tooth, whereby when said tool is being used to sharpen the teeth of a saw chain, one of said planar surfaces rests on said top plate of the tooth being sharpened providing a guide during the sharpening operation and whereby the teeth on an entire chain can be sharpened from either side of the saw chain.

2. The device as set forth in claim 1 further comprising: a longitudinally extending projection integral with one end of said guide for aiding in holding said sharpener during the sharpening operation; and a collar integral with the other end of said guide for securing said guide on said motor housing.

3. The device set forth in claim 1, wherein said planar surface members are provided with angle marks which aid in aligning said grinding rock relative to said tooth insuring placing the proper cutting angle on said tooth during the sharpening operation.

References Cited

UNITED STATES PATENTS

| | | |
|---|---|---|
| 2,664,017 | 12/1953 | Cox. |
| 2,770,985 | 11/1956 | Pearce. |
| 2,793,544 | 5/1957 | Rogers. |
| 2,850,923 | 9/1958 | Gommel. |
| 3,091,136 | 5/1963 | Maier. |

GRANVILLE Y. CUSTER, JR., *Primary Examiner.*